United States Patent
Foster et al.

(10) Patent No.: US 8,028,717 B2
(45) Date of Patent: Oct. 4, 2011

(54) HIGH THROUGHPUT DOUBLE VALVE WITH REDUCED OUTLET PRESSURE DURING A FAULTED STATE

(75) Inventors: Joseph E. Foster, Sterling Heights, MI (US); Richard Schnell, Oswego, IL (US); Deborah Schnell, legal representative, Oswego, IL (US)

(73) Assignee: Ross Operating Valve Company, Troy, MI (US)

( * ) Notice: Subject to any disclaimer, the term of this patent is extended or adjusted under 35 U.S.C. 154(b) by 1034 days.

(21) Appl. No.: 11/906,927

(22) Filed: Oct. 4, 2007

(65) Prior Publication Data

US 2009/0090421 A1   Apr. 9, 2009

(51) Int. Cl.
    *F15B 20/00*   (2006.01)
(52) U.S. Cl. .................................. 137/596.16; 91/424
(58) Field of Classification Search ............ 137/596.16, 137/596.18; 91/424, 448
    See application file for complete search history.

(56) References Cited

U.S. PATENT DOCUMENTS

| | | | | |
|---|---|---|---|---|
| 4,269,225 A | * | 5/1981 | Ruchser et al. | 137/596.16 |
| 4,345,620 A | * | 8/1982 | Ruchser et al. | 137/596.16 |
| 4,353,392 A | * | 10/1982 | Ruchser et al. | 137/596.16 |
| 4,542,767 A | | 9/1985 | Thornton et al. | |
| 5,850,852 A | * | 12/1998 | Russell et al. | 137/596.16 |
| 5,927,324 A | * | 7/1999 | Russell et al. | 137/596.16 |
| 6,155,293 A | * | 12/2000 | Haselden et al. | 137/596.16 |
| 6,318,396 B1 | * | 11/2001 | Haselden et al. | 137/596.16 |
| 6,478,049 B2 | | 11/2002 | Bento et al. | |
| 6,604,547 B1 | * | 8/2003 | Bento | 137/596.16 |
| 6,840,258 B1 | | 1/2005 | Russell et al. | |
| 6,840,259 B1 | | 1/2005 | Russell et al. | |
| 7,114,521 B2 | | 10/2006 | Bento | |

FOREIGN PATENT DOCUMENTS

EP   0684392 A1   11/1995

* cited by examiner

*Primary Examiner* — Craig Schneider
*Assistant Examiner* — Craig J Price
(74) *Attorney, Agent, or Firm* — Carlson, Gaskey & Olds PC (57) ABSTRACT

A double valve having inlet, outlet, and exhaust ports maintains an outlet pressure below one percent of inlet pressure during a faulted state while maintaining a relatively small exhaust for reduced overall valve size. Crossover passages receive inlet pressure through main crossover poppets when the respective valve units are not in a deactuated position. When the valve units are in a deactuated position, then the crossover passages receive inlet pressure through respective bypass passages whose flow rate can be controlled independently from the size of the crossover poppets. The use of bypass passages provides particular benefits for double valves for non-press applications which have a ratio of exhaust flow coefficient to inlet flow coefficient that is less than about 2.5.

15 Claims, 10 Drawing Sheets

HIGH THROUGHPUT DOUBLE VALVE WITH REDUCED OUTLET PRESSURE DURING A FAULTED STATE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to control valves for fluid power systems, and, more specifically, to a double valve for simultaneously achieving a high input to output flow coefficient during its actuated state and a very low outlet pressure during a faulted state.

Machine tools of various types operate through a valving system, which interacts with a fluid power-controlled clutch and/or brake assembly. The control valves used to operate these machine tools require the operator to activate two separate control switches substantially simultaneously to ensure that an operator's hands or other obstructions are away from the moving components of the machine tool when an operating cycle is initiated. Typically, an electronic circuit responsive to the two control switches generates a control signal applied to the actuators for switching the main fluid circuit of the valve to control delivery of compressed air or other fluid to the machine tool to perform its operating cycle.

Double valves having two separate valve units operating in parallel within one main valve body have been developed to ensure that a repeat or overrun of a machine tool operating cycle cannot be caused by malfunction of a single valve unit. For example, if one valve unit fails to deactuate at the proper time or if the valve units actuate in a non-synchronous manner, the double valve assumes a fault configuration that continuously diverts the source of fluid power away from the machine tool. A double valve is shown, for example, in commonly assigned U.S. Pat. No. 6,840,258 and U.S. Pat. No. 6,840,259, which are incorporated herein by reference.

In known double valves for operating presses and other machine tools, it is desirable to quickly exhaust the pressurized fluid from the outlet when the valve is deactuated so that the outlet pressure rapidly drops to the pressure that allows the brake mechanism to actuate. The coefficient of flow, $C_v$, is a measure of a device's efficiency in permitting fluid flow, and is calculated based on measured fluid flow rate and the pressure differential across an orifice. The $C_v$ measured in a double valve from the inlet to the outlet is not typically equal to the $C_v$ measured from the outlet to the exhaust. A double valve utilized in press applications typically has a higher outlet-to-exhaust $C_v$ than an inlet-to-outlet $C_v$.

Fluid flow through crossover passages within the double valve cause the movement of one valve unit to influence the movement of the other valve unit. The crossover passages are normally pressurized in both the actuated and deactuated states of the valve. In a faulted state of the valve, one crossover is pressurized and the other is opened to the outlet and to the exhaust port through the outlet. Inlet pressure flowing into the crossover that is open to the outlet causes a certain amount of pressure to continue to be present in the outlet during the faulted state. Industry standards state that such pressure should be maintained at less than one percent of the pressure of the fluid supply. Due to the relatively large flow capacity of the exhaust, prior art double valves for press and machine tool applications met the objective of less than one percent.

It would be desirable to utilize the lockout capability and dynamic monitoring features of double valves in non-press applications. Such applications would typically employ a continuous and relatively greater $C_v$ between the inlet and the outlet, which is achieved by scaling up the sizes of the inlet, outlet, and valve units. The scaling up of the inlet-to-outlet $C_v$, however, would tend to increase the flow into the outlet during a faulted state which is undesirable for the reasons stated above. This increase is due in part to the pressurization of the crossover passages through respective flow restrictors provided between the crossover passages and the inlet. The flow restrictors are also part of the main flow paths between the inlet and the outlet. When the inlet, outlet, and valve units are scaled up to provide a higher $C_v$, the flow restrictor passages feeding the crossovers likewise are scaled up so that it is not possible to effectively limit or control the flow from the crossover into the outlet during a fault state by scaling these various valve elements.

Maintaining an outlet pressure below one percent of inlet pressure could be achieved by scaling up of the exhaust port and the exhaust poppets, but these steps are undesirable because of added cost and an increased-package size for the double valve.

SUMMARY OF THE INVENTION

The present invention provides modified interaction between the inlet and the crossover passages in a double valve leading to advantages of maintaining an outlet pressure below one percent of inlet pressure during a faulted state while maintaining a relatively small exhaust for reduced overall physical valve size. It provides particular benefits for the use double valves in non-press applications and for the use of double valves having a ratio of exhaust $C_v$ in the deactuated state to inlet $C_v$ in the actuated state that is less than about 2.5.

In one aspect of the invention, a valve system comprises a body defining an inlet, an outlet, and an exhaust. A first valve unit is movable to a deactuated position, wherein the deactuated position comprises the first inlet poppet being in its closed position and the first exhaust poppet being in its open position. A second valve unit is movable to a deactuated position, wherein the deactuated position comprises the second inlet poppet being in its closed position and the second exhaust poppet being in its open position. The valve system is in a faulted state when one of the first and second valve units is in a deactuated position when the other of the first and second valve units is not in a deactuated position.

The valve system further comprises first and second crossover passages and first and second crossover poppets. A first bypass passage couples the inlet and the first crossover passage, wherein the first bypass passage has a predetermined cross-section to provide a predetermined flow such that when the valve system is in the faulted state and the second valve unit is not in the deactuated position then pressurized fluid passing through the first bypass passage pressurizes the outlet to no more than 1% of the pressure of the source of pressurized fluid. A second bypass passage couples the inlet and the second crossover passage, wherein the second bypass passage has a predetermined cross-section to provide a predetermined flow such that when the valve system is in the faulted state and the first valve unit is not in the deactuated position then pressurized fluid passing through the first bypass passage pressurizes the outlet to no more than 1% of the pressure of the source of pressurized fluid.

DETAILED DESCRIPTION OF PREFERRED EMBODIMENTS

Figure 1:
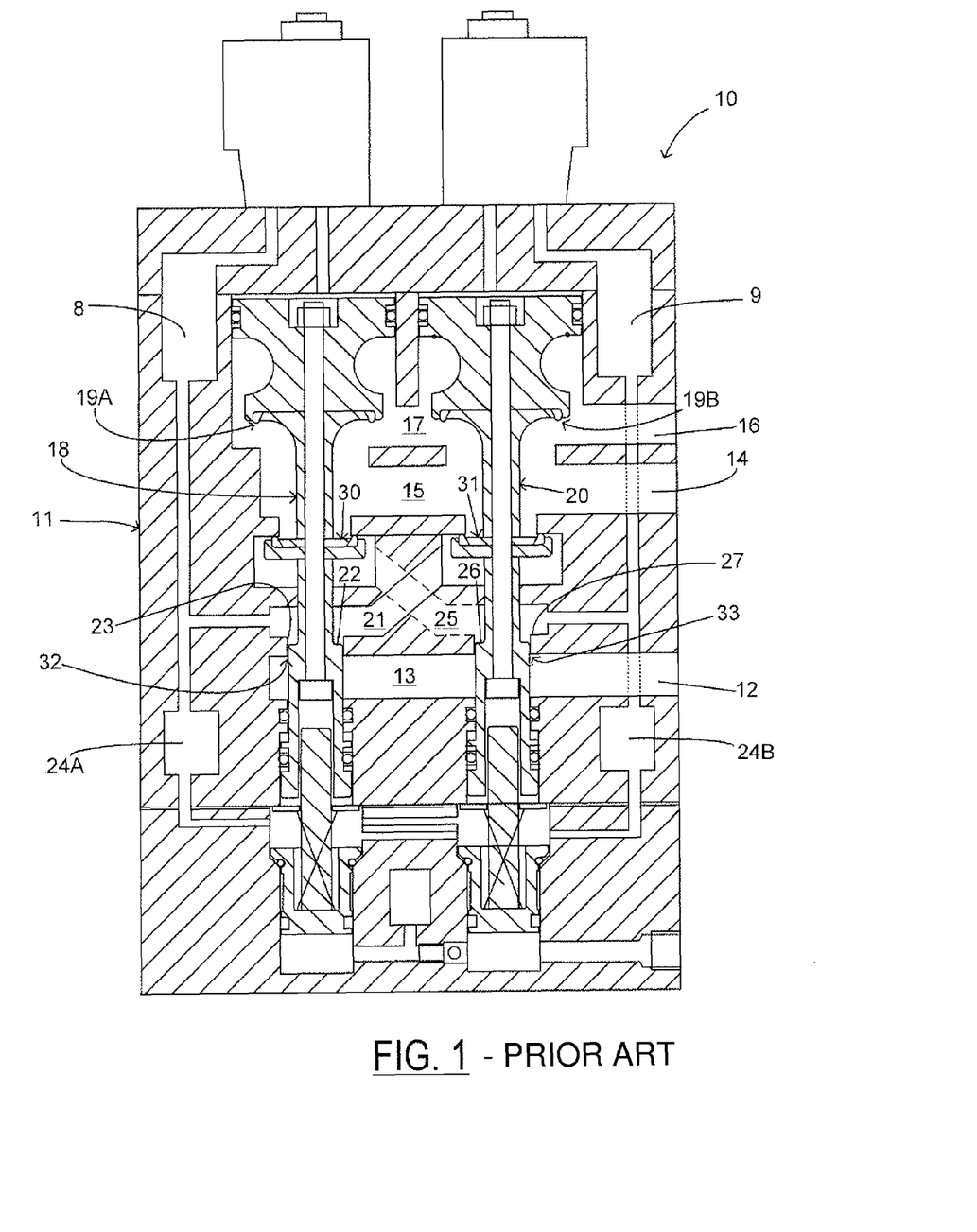
FIG. 1 is a cross-sectional view of a prior art double valve having flow restrictors for feeding the crossovers, with the valve in its deactuated state.

Referring now to FIG. 1, a control valve system known in the art and shown in the form of a double valve 10 includes a body 11 having an inlet port 12 leading to an inlet chamber 13, an outlet port 14 leading to an outlet chamber 15, and an exhaust port 16 leading to an exhaust chamber 17.

Chambers 13, 15, and 17 are joined by various passages to create bores for receiving a first valve unit 18 and a second valve unit 20. A first crossover-passage 21 is pressurized by fluid supplied from an external source (not shown) to inlet 12 and then through inlet chamber 13 via a first flow restrictor 32 formed by a shoulder 22 of first valve unit 18 receivable in an orifice 23. A second crossover passage 25 is pressurized by fluid supplied from an external source to inlet 12 and then through inlet chamber 13 via a second flow restrictor 33 formed by a shoulder 26 of second valve unit 20 receivable in an orifice 27. First valve unit 18 also includes an inlet poppet 30 at the outlet end of crossover passage 25. Second valve unit 20 includes an inlet poppet 31 at the outlet end of crossover passage 21. Valve units 18 and 20 are shown in their deactuated positions with shoulders 22 and 26 in mechanical contact with orifices 23 and 27, respectively, so that pressurized fluid from inlet chamber 13 flows at a reduced rate as compared to the actuated positions into crossover passages 21 and 25, respectively. The pressure in crossover passages 21 and 25 helps maintain inlet poppets 30 and 31 seated in the deactuated positions.

Figure 2:
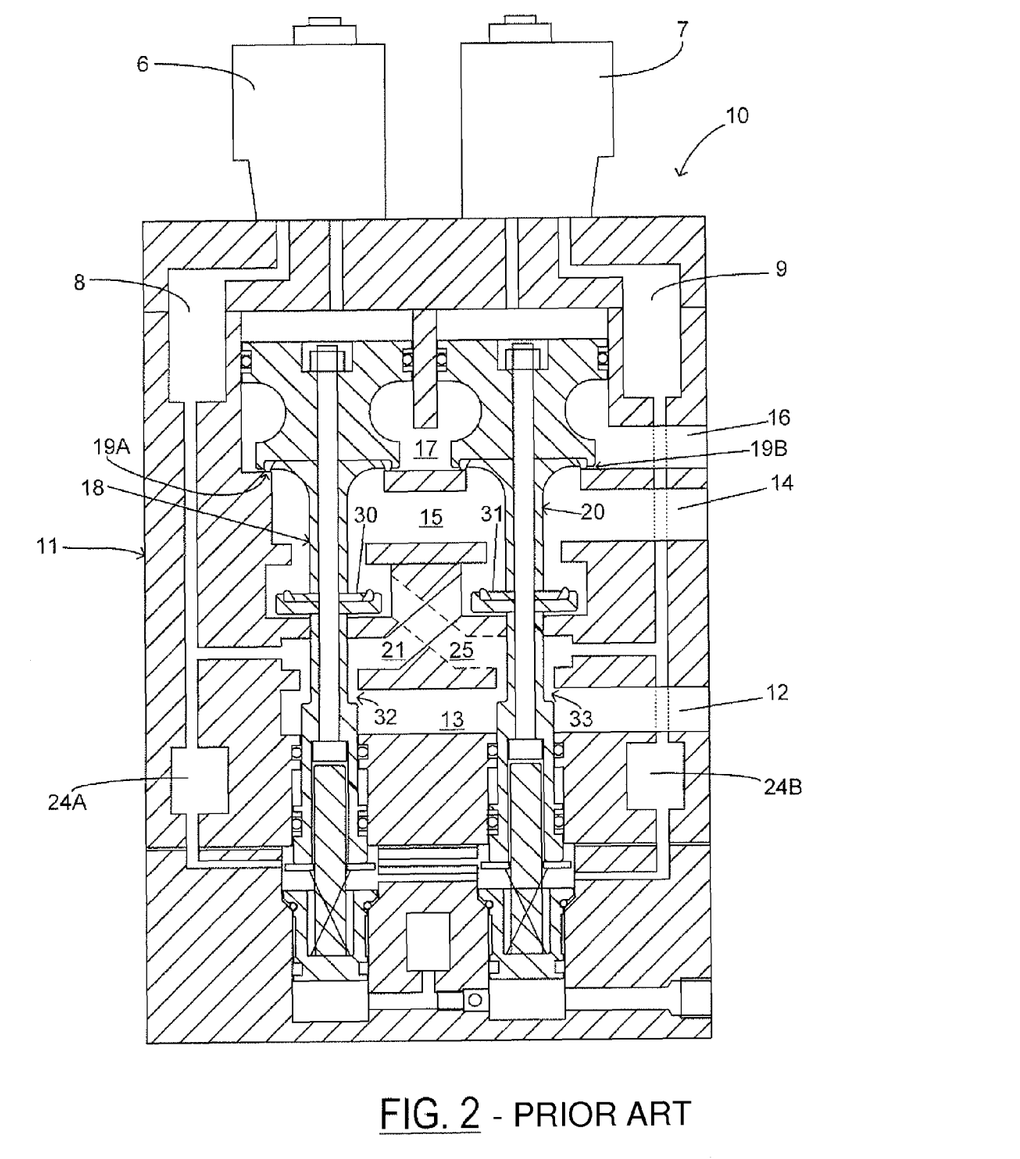
FIG. 2 is a cross-sectional view of the prior art double valve of FIG. 1 in its actuated state.

FIG. 2 shows the double valve with valve units 18 and 20 in their actuated positions. Valve units 18 and 20 are pushed downward in FIG. 2 by pressure supplied by actuators 6 and 7, which may preferably comprise pilot valves. The actuator pressure is obtained from timing chambers 8 and 9, respectively. With valve units 18 and 20 in their actuated positions, fluid flows from inlet 12 through inlet chamber 13, flow restrictors 32 and 33, crossover passages 21 and 25, and inlet poppets 30 and 31 to outlet chamber 15.

Figure 3:
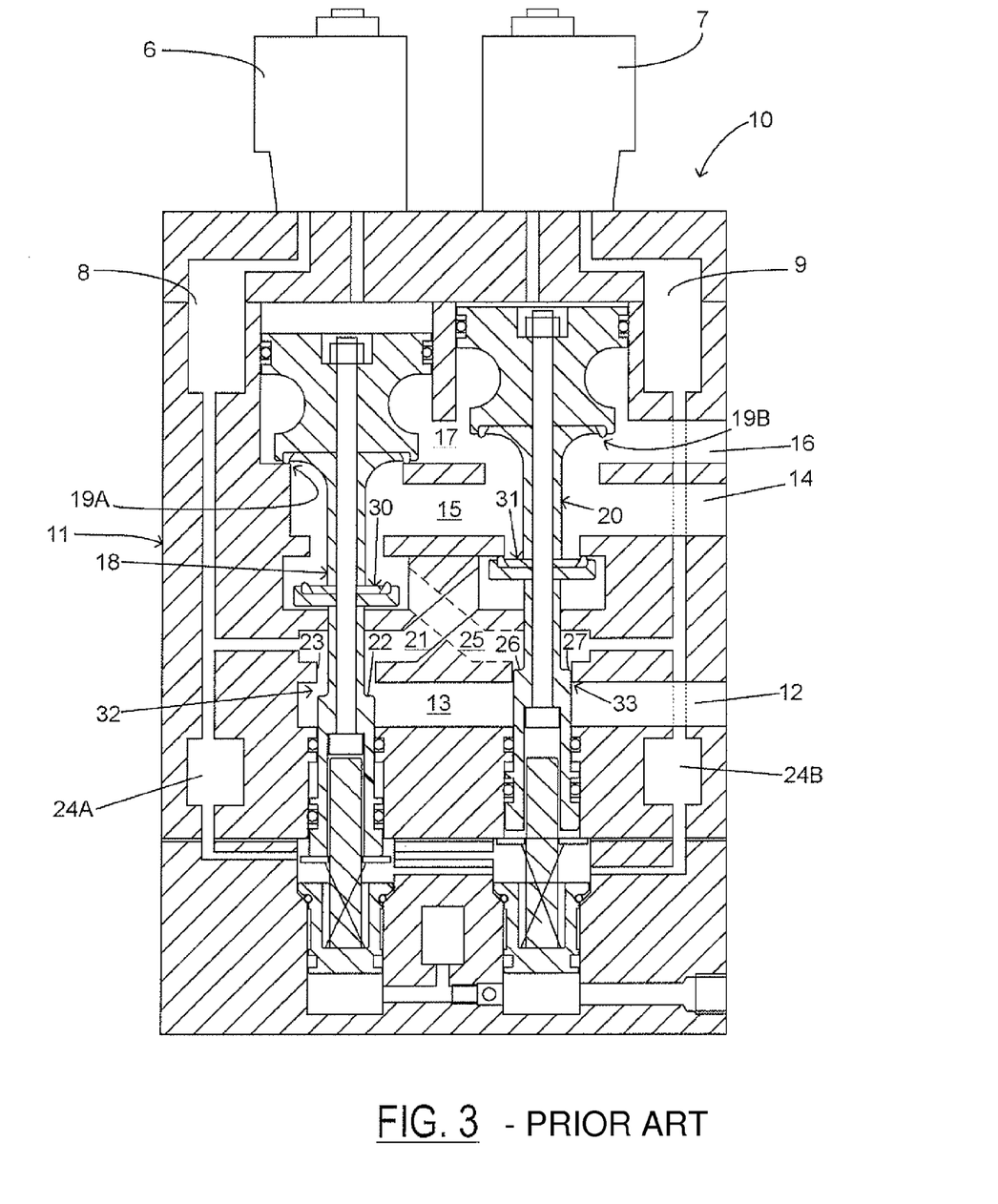
FIG. 3 is a cross-sectional view of the prior art double valve of FIG. 1 in a faulted state.

FIG. 3 shows double valve 10 in a faulted state wherein first valve unit 18 is in an actuated position and second valve unit 20 is in a deactuated position. First crossover passage 21 is open via the flow restrictor 32 to inlet chamber 13 and the resulting pressure maintains second inlet poppet 31 on seat which, in turn, keeps second valve unit 20 in its deactuated position. Second crossover passage 25 is open via first inlet poppet 30 to outlet chamber 15 and to exhaust chamber 17 through the open exhaust poppet 19B. Pressure in passage 25 is evacuated which results in the loss of pressure to return chamber 24B and to timing chamber 9, which would be used by actuator 7 to actuate second valve unit 20, thereby keeping the valve 10 in the faulted state until it is positively reset. It is to be understood that double valve 10 is also in a faulted state when first valve unit 18 is in a deactuated position and second valve unit 20 is in an actuated position, and in that event, a flow analysis similar to that above applies.

Figure 4:
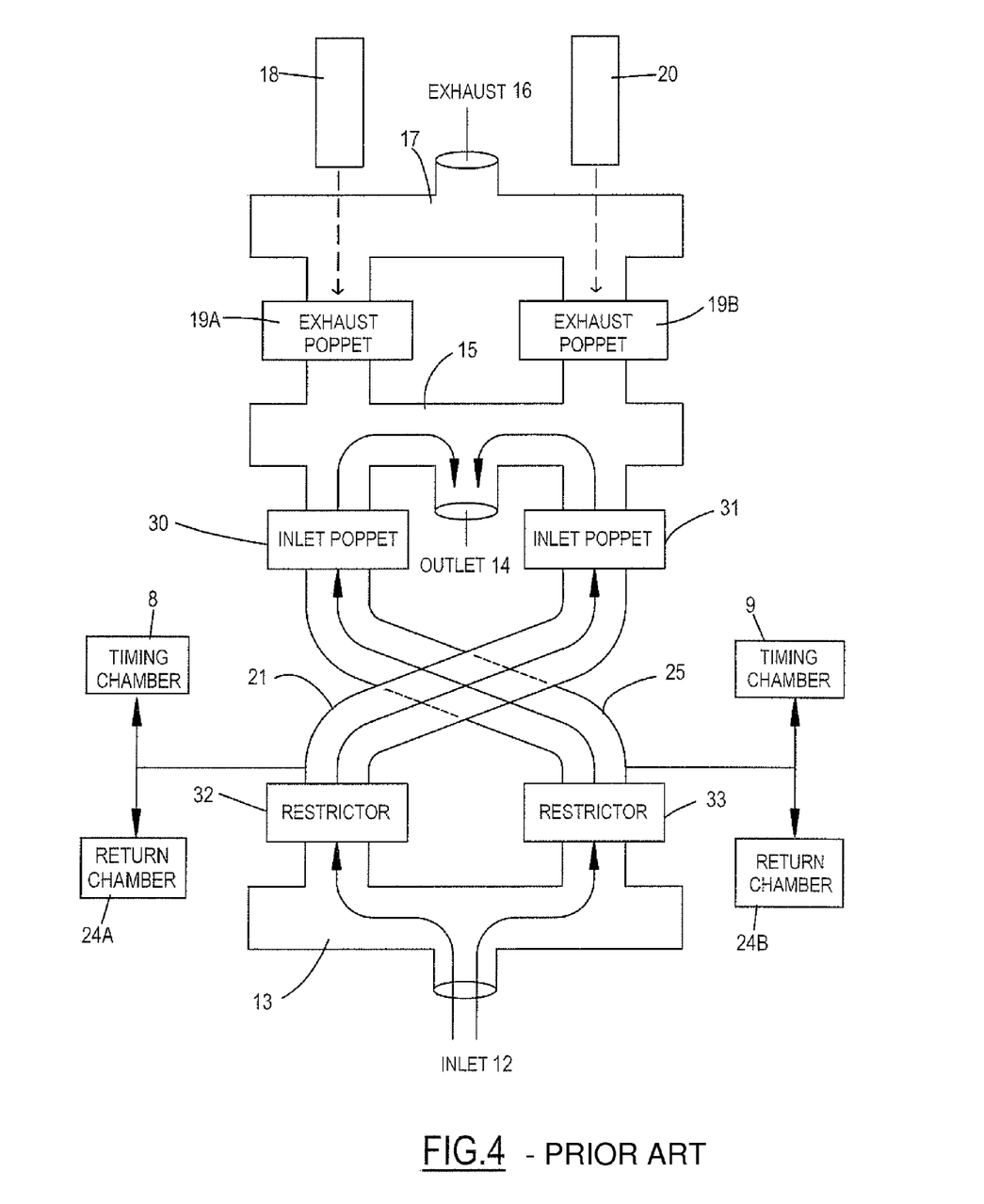
FIG. 4 is a schematic diagram showing the fluid flow paths through the prior art double valve.

Referring to FIG. 4, fluid flow paths of the valve are shown schematically between inlet 12 and outlet 14 for an actuated state. In the actuated state, flow passes through both sides of the double valve 10. Fluid flow into inlet 12 passes through inlet chamber 13 and flow restrictors 32 and 33 into first crossover passage 21 and second crossover passage 25, respectively. Fluid flow leaves the crossover passages 21 and 25 through inlet poppet 30 and inlet poppet 31 into outlet chamber 15 and through outlet 14 to the controlled device or circuit. Crossovers 21 and 25 are pressurized during unfaulted valve operation. Pressurized fluid flows from inlet 12 through to inlet chamber 13, and then on to timing chamber 8 and return chamber 24A. Pressurized fluid also flows from inlet 12 through inlet chamber 13 and then on to timing chamber 9 and return chamber 24B. Thus, timing chamber 8 maintains a source of pressurized fluid for actuator 6 that controls actuation of first valve unit 18 and for return chamber 24A which provides a return force against second valve unit 20.

When valve 10 enters a faulted state, one crossover passage 21 or 25 will be pressurized and the other crossover passage 21 or 25 will be depressurized. Consequently, one timing chamber 8 or 9 and one return chamber 24B or 24A will not have the pressure needed for actuation and will thereby maintain valve 10 in the faulted state until a reset operation is performed in response to external application of a resetting force to the valve units 18 and 20.

Figure 5:
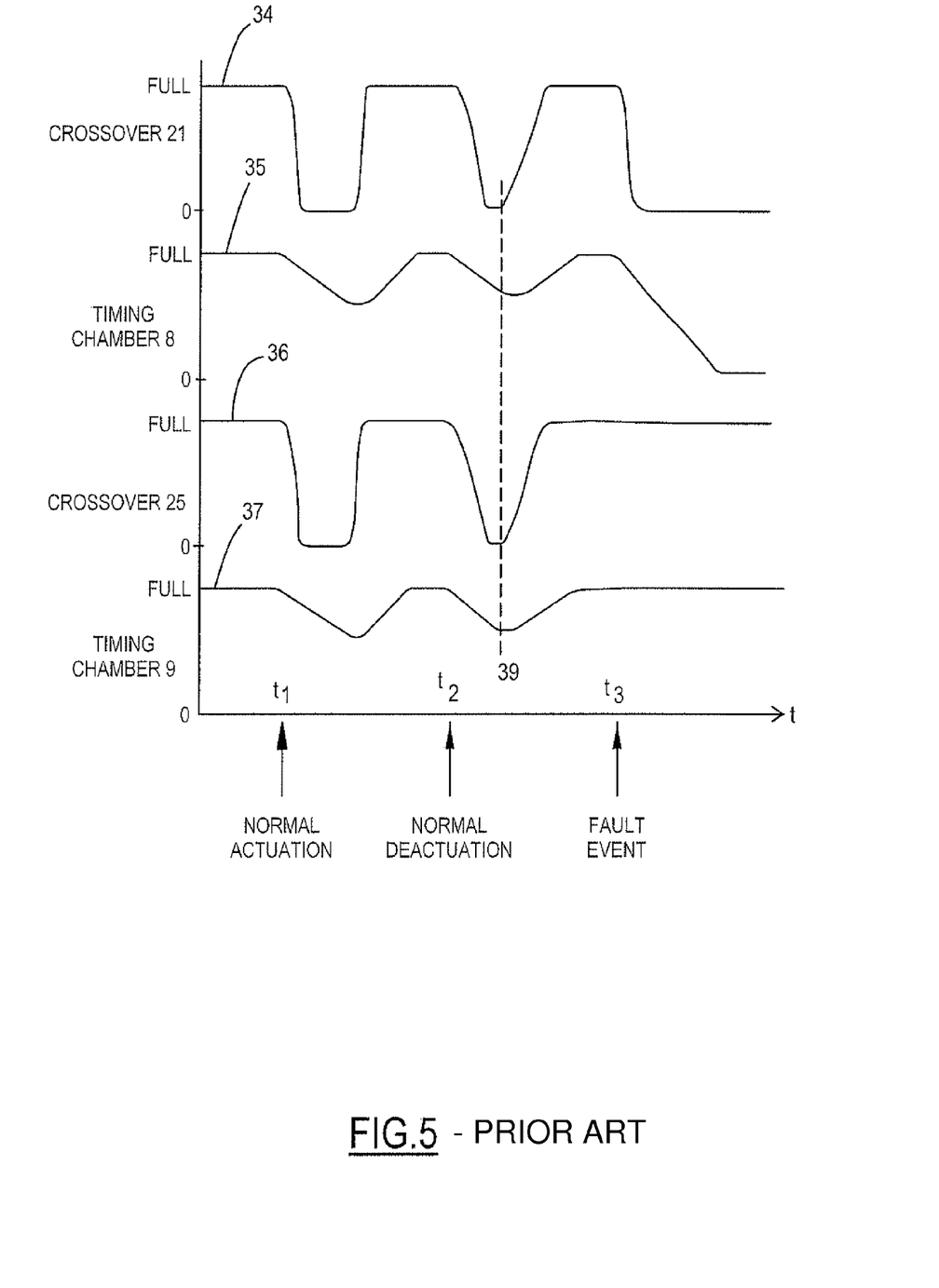
FIG. 5 is a graph showing pressure in the crossover passages and the timing chambers during prior art double valve operation.

To further illustrate the pressurization of crossover passages 21 and 25 and timing chambers 8 and 9, FIG. 5 shows a plot of pressure at the timing chambers 8 and 9 and crossover passages 21 and 25 during cycles of valve 10. A curve 34 shows pressure in the crossover passage 21 between full pressure and approximately zero pressure. Likewise, a curve 35 corresponds to timing chamber 8, a curve 36 corresponds to crossover passage 25, and curve 37 corresponds to timing chamber 9. Initially, crossovers 21 and 25 and timing chambers 8 and 9 are at full inlet pressure. An actuation of the valve 10 begins to occur at time $t_1$. Pressure in crossover passages 21 and 25 quickly drops when valve units 18 and 20 begin to move because when the inlet poppets 30 and 31 first begin to open, the exhaust poppets 19A and 19B have not yet closed and a path from the crossover passages 21 and 25 to exhaust 16 exists. Since timing chambers 8 and 9 are coupled to crossover passages 21 and 25 through respective restrictors 32 and 33, pressure in timing chambers 8 and 9 drops more slowly beginning at time $t_1$. As valve elements 18 and 20 continue to move, exhaust poppets 19A and 19B eventually close and the pressure in crossover passages 21 and 25 quickly returns to full pressure. More gradually, pressure in timing chambers 8 and 9 likewise returns to full pressure.

Deactuation of double valve 10 begins at time $t_2$. The pressure levels shown in curves 34 and 36 for crossover passages 21 and 25 quickly drop to approximately zero since the returning valve units 18 and 20 have their inlet and exhaust poppets 30, 31, 19A and 19B open substantially simultaneously. Once inlet poppets 30 and 31 close at point 39, crossover passages 21 and 25 repressurize but the repressurization occurs more slowly than following an actuation operation because crossover passages 21 and 25 are now being repressurized through flow restrictors 32 and 33. Once again, as crossover passages 21 and 25 re-pressurize, the pressure in timing chambers 8 and 9 recovers to a full pressure.

An exemplary fault event involving valve unit 18 is shown occurring at a time $t_3$. Valve element 18 fails to move and the pressure in crossover passage 25 and timing chamber 9 fed by crossover passage 25 remain at their full pressure. The pressure in crossover passage 21 and timing chamber 8 both fall to approximately zero since valve unit 20 becomes trapped in an actuated position.

As made apparent from FIG. 5, flow restrictors 32 and 33 for pressurizing crossover passages 21 and 25 during various cycles of valve 10 need to pressurize crossover passages 21 and 25 quickly enough to keep timing chamber pressure from dropping too much but slow enough that fluid escaping through one timing chamber into the outlet 14 during a faulted state does not exceed 1% of the inlet pressure.

Figure 6A:
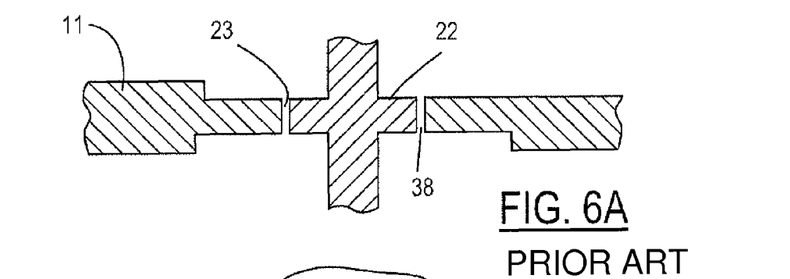
FIG. 6A is a side, cross-sectional view of the prior art flow restrictor.
Figure 6B:
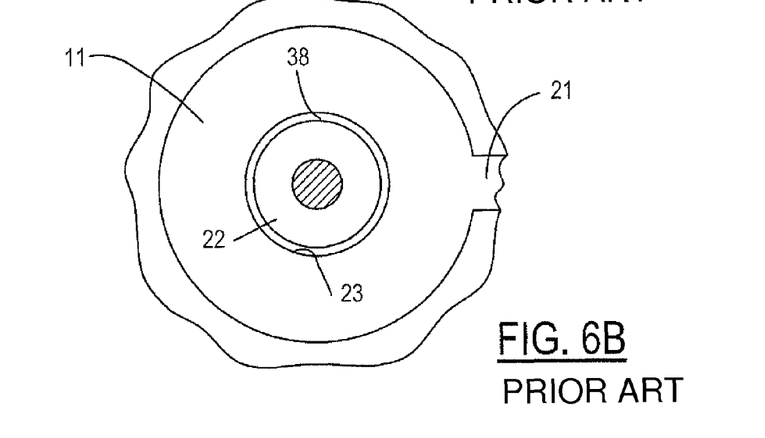
FIG. 6B is a top view of the flow restrictor of FIG. 6A.

FIGS. 6A and 6B show in greater detail a prior art flow restrictor wherein a spool-type valve unit 18 includes a shoulder 22 for selectively blocking an orifice 23 in valve body 11. When shoulder 22 is fully received within orifice 23, a gap 38 provides for the restricted flow which is used to pressurize a respective crossover passage 21 while the corresponding valve unit 18 is in its deactuated position. When orifice 23 is not blocked by shoulder 22, and when the double valve is in an actuated state, orifice 23 supports approximately one-half of the full fluid flow through the valve to outlet 14. When a higher flow capacity is required for the valve, then orifice 23 is necessarily larger. As orifice 23 becomes larger, the outer periphery of shoulder 22 likewise becomes larger. The cross-sectional area of gap 38 determines the overall flow into crossover passage 21 in the deactuated position. For a larger orifice, it becomes necessary to maintain a very thin gap 38 to obtain the desired area for gap 38, which may not be easily obtainable at normal manufacturing tolerances and which may result in impeded movement of valve unit 18. Therefore, prior art double valves have not been utilized in certain high-flow applications as described above.

Figure 7:
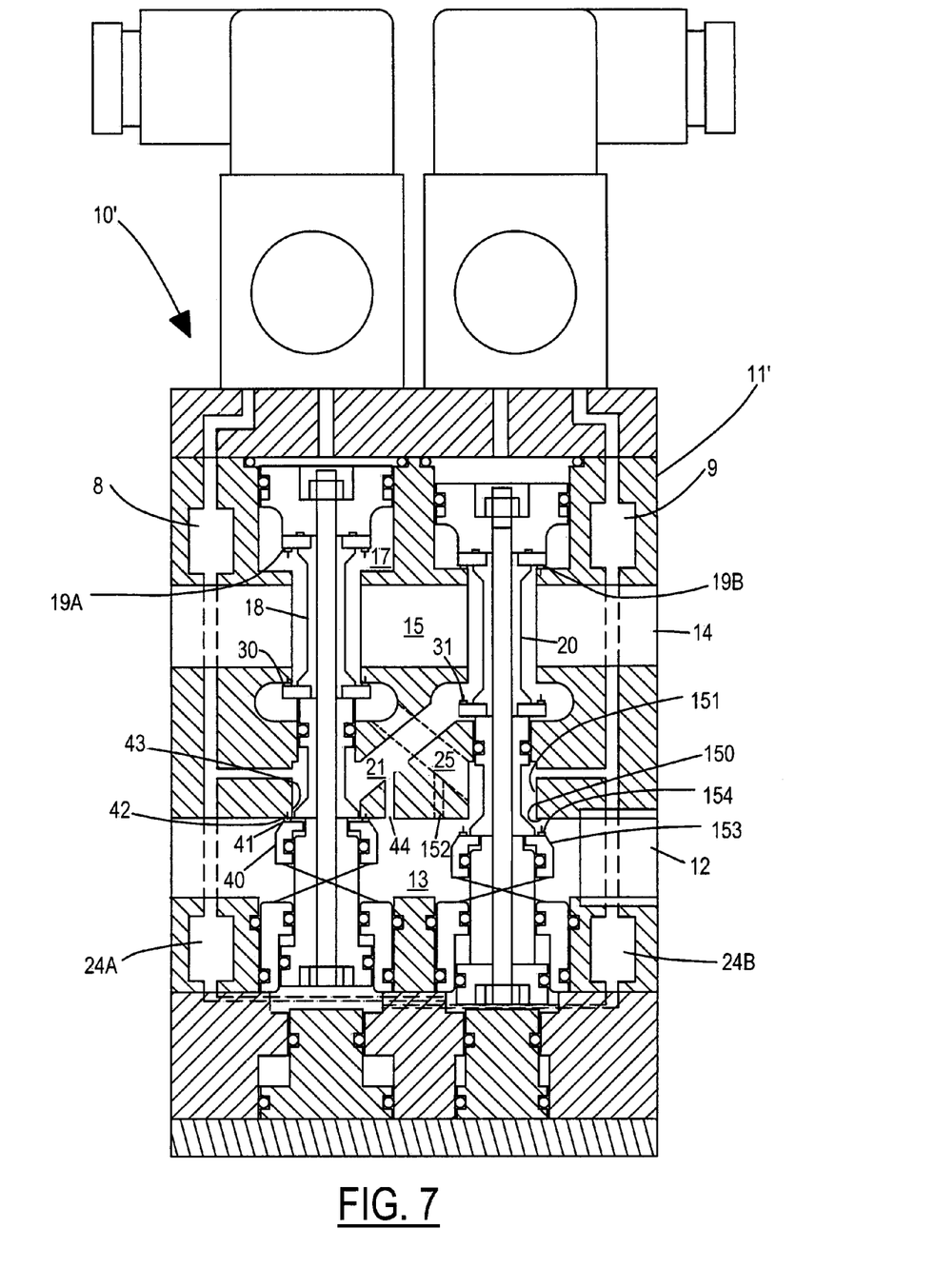
FIG. 7 is a side, cross-sectional view of a double valve according to a first embodiment of the invention.

FIG. 7 shows an inventive structure wherein valve unit 18 is in mechanical contact with a crossover poppet 40. A seal 41 abuts a sealing surface 42 of valve body 11' to seal an orifice 43 when valve unit 18 is in its deactuated position. In order to supply pressurized fluid to crossover passage 21, a bypass passage 44 is formed through valve body 11' to connect inlet chamber 13 and crossover passage 21. Bypass passage 44 can be manufactured with any desired cross-section (e.g., a flow profile such as a circular diameter or other cross-sectional area) for proper pressurization of crossover passage 21 within the time constraints and without introducing excess fluid that would over-pressurize outlet 14 during a fault state. Any time that inlet chamber 13 is pressurized and crossover passage 21 is at a lower pressure, pressurized fluid will flow through bypass passage 44 into crossover passage 21 whether the valve 10' is in an actuated state, a deactuated state, or a faulted state.

Referring still to FIG. 7, valve unit 20 is in mechanical contact with crossover poppet 153. A seal 154 abuts a sealing surface 150 to seal orifice 151 when valve unit 20 is in its deactuated position. To supply pressurized fluid to crossover passage 25, a bypass passage 152 is formed through valve body 11' to connect inlet chamber 14 and crossover passage 25. Bypass passage 152 can be manufactured with any desired cross-section for proper pressurization of crossover passage 25 within the time constraints and without introducing excess fluid that would over-pressurize outlet 14 during a fault state. Any time that inlet chamber 13 is pressurized and crossover passage 25 is at a lower pressure, pressurized fluid will flow through bypass passage 152 into crossover passage 25 whether valve 10' is in an actuated state, deactuated state, or a faulted state.

Operation of the inventive double valve 10' is as follows. During an actuation, valve unit 18 shifts so that fluid flows past an open crossover poppet 40 into crossover passage 21. If double valve 10' actuates properly, then fluid flows from inlet chamber 13 to crossover passage 21 and then to outlet chamber 15, and fluid also flows to timing chamber 8 and return chamber 24A. During a deactuation, valve unit 18 shifts so crossover poppet 40 closes. Fluid then flows from inlet chamber 13 into crossover passage 21 via bypass passage 44. Fluid continues to flow to timing chamber 8 and return chamber 24A until they are fully pressurized.

Also during an actuation, valve unit 20 shifts so that fluid flows past an open crossover poppet 153 into crossover passage 25. If double valve 10' actuates properly, then fluid flows from inlet chamber 13 to crossover passage 25 and then to outlet chamber 15, and fluid also flows to timing chamber 9 and return chamber 24B. During a deactuation, valve unit 20 shifts so crossover poppet 153 closes. Fluid then flows from inlet chamber 13 into crossover passage 25 via bypass passage 152. Fluid continues to flow to timing chamber 9 and return chamber 24B until they are fully pressurized.

In the event that valve 10' enters a faulted state with valve unit 18 in its actuated position, then fluid from inlet chamber 13 flows past crossover poppet 40 into crossover-passage 21 so that valve unit 20 is held in a deactuated position by 1) the fluid in crossover passage 21 acting on inlet poppet 31, and 2) the pressurization of return chamber 24B.

If valve 10' enters a faulted state with valve unit 20 in its actuated position, then fluid from inlet chamber 13 flows past crossover poppet 153 into crossover passage 25 so that valve unit 18 is held in a deactuated position by 1) the fluid in crossover passage 21 acting on inlet poppet 30, and 2) the pressurization of return chamber 24A.

In the event that valve 10' enters a faulted state with valve unit 18 in its deactuated position, then fluid is blocked at crossover poppet 40. However, fluid continues to flow through bypass passage 44 into crossover passage 21. This fluid exits crossover passage 21 to atmosphere via inlet poppet 31 and exhaust poppet 19B. As a result of the venting to atmosphere, pressure drops in timing chamber 8 so that actuator 6 is unable to move valve unit 18 out of its deactuated position. Since crossover poppet 40 is closed, the main source of fluid flowing into outlet chamber 15 is through bypass passage 44, and the pressurization of outlet 14 is held to below 1% of the pressure in inlet chamber 13.

If valve 10' enters a faulted state with valve unit 20 in its deactuated position, then fluid is blocked at crossover poppet 153. Fluid continues to flow through bypass passage 152 into crossover passage 25. This fluid exits crossover passage 25 to atmosphere via inlet poppet 30 and exhaust poppet 19A. As a result of the venting to atmosphere, pressure drops in timing chamber 9 so that actuator 7 is unable to move valve unit 20 out of its deactuated position. Since crossover poppet 153 is closed, the main source of fluid flowing into outlet chamber 15 is through bypass passage 152, and the pressurization of outlet 14 is held to below 1% of the pressure in inlet chamber 13.

Figure 8:
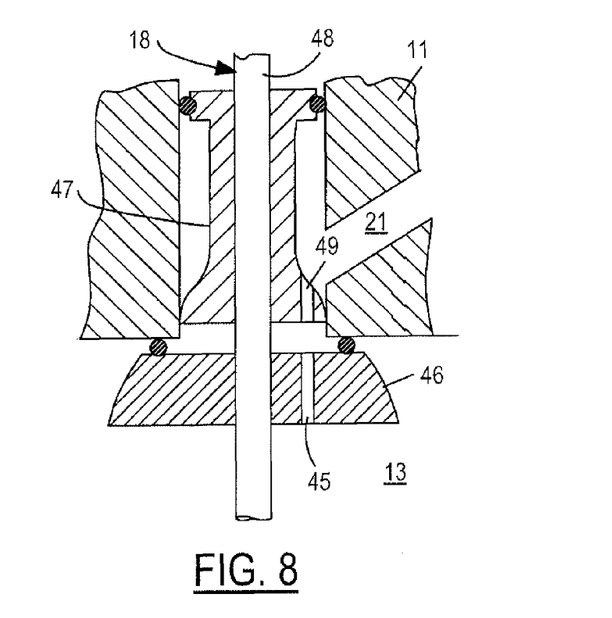
FIG. 8 is a side, cross-sectional view of a poppet valve and bypass passage according to a second embodiment of the invention.

FIG. 8 shows an alternative embodiment for crossover poppet 40, 153 and for bypass passage 44, 152 wherein a bypass passage 45 is provided in a crossover poppet 46. Depending upon the presence of a spacer 47 which may be fixedly or slideably mounted to a shaft 48, a passage 49 may be utilized within spacer 47 to complete the bypass between inlet chamber 13 and crossover passage 21, 25. Any time that inlet chamber 13 is pressurized and crossover passage 21, 25 is at a lower pressure, pressurized fluid will flow through bypass passage 45 (and passage 49, if used) into crossover passage 21, 25 whether the valve is in an actuated state, a deactuated state, or a faulted state.

Overall valve operation using the embodiment of FIG. 8 is similar to that as described in connection with the embodiment illustrated in FIG. 7. During an actuation, valve unit 18 shifts so that fluid flows from inlet 12 into inlet chamber 13 and past open crossover poppet 46 into crossover passage 21. Fluid also flows from inlet 12 into inlet chamber 13 to timing chamber 8 and return chamber 24A. If double valve 10' actuates properly, then fluid from crossover passage 21 flows to outlet chamber 15. During a deactuation, valve unit 18 shifts so crossover poppet 46 closes. Fluid then flows from inlet 12 into inlet chamber 13 and into crossover passage 21 via bypass passages 45 and 49, if present. Fluid also flows from inlet 12 into inlet chamber 13 on to timing chamber 8 and return chamber 24A until they are fully pressurized. A similar fluid flow description during an actuation applies with respect to valve unit 20.

In the event that valve 10' enters a faulted state with valve unit 18 in its actuated position, then fluid from inlet chamber 13 flows past crossover poppet 46 into crossover passage 21 so that valve unit 20 is held in a deactuated position by 1) the fluid in crossover passage 21 acting on inlet poppet 31 and 2) the pressurization of return chamber 24A. A similar flow description applies in the event that valve 10' enters the faulted state with valve unit 20 in its actuated position.

In the event that valve 10' enters a faulted state with valve unit 18 in its deactuated position, then fluid is blocked at crossover poppet 46. However, fluid continues to flow through bypass passages 45 and 49 into crossover passage 21. This fluid exits crossover passage 21 to atmosphere via inlet poppet 31 and exhaust poppet 19A. As a result of the venting to atmosphere, pressure drops in timing chamber 8 so that actuator 6 is unable to move valve unit 18 out of its deactuated position. Since crossover poppet 46 is closed, the main source of fluid flowing into outlet chamber 15 is through bypass passages 45 and 49, and the pressurization of outlet 14 is held to below 1% of the pressure in inlet chamber 13. A similar flow description applies in the event that valve 10' enters the faulted state with valve unit 20 in its actuated position.

Figure 9:
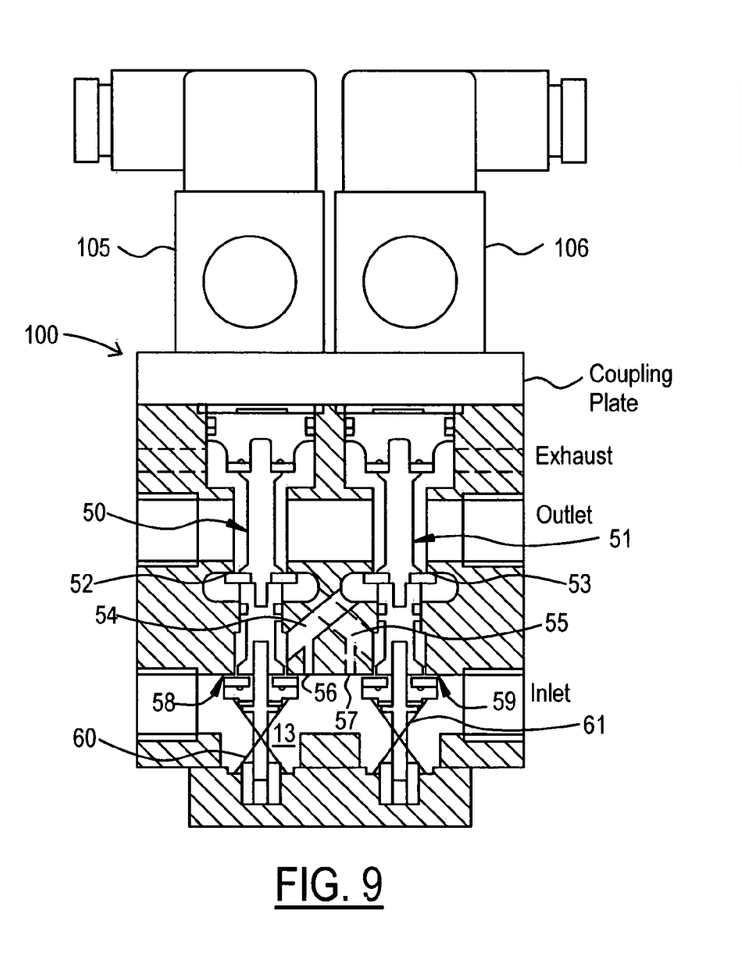
FIG. 9 is a cross-sectional view of a two-position double valve of the present invention using a spring return in a deactuated state.

FIG. 9 shows an alternative embodiment of a double valve 100 employing a spring return which may be useful in many non-press applications. The double valve 100 includes first and second valve units 50 and 51 having inlet poppets 52 and 53, respectively. First and second crossover passages 54 and 55 are fed by bypass passages 56 and 57 through the main valve body. Crossover poppets 58 and 59 are closed when the valve units are in their deactuated position. Springs 60 and 61 are provided in engagement with valve units 50 and 51 to urge them into their deactuated position. With valve 100 in the actuated-state, if the actuators 105, 106 become deactuated, valve units 50 and 51 will move to their deactuated positions under spring, force. As in the previous embodiments, any time that inlet pressure is higher than crossover pressure, pressurized fluid will flow-through bypass passages 56 and 57 whether valve 100 is in an actuated state, a deactuated state, or a faulted state. Otherwise, fluid flows within valve 100 in a similar manner as described above with reference to FIGS. 7 and 8.

Figure 10:
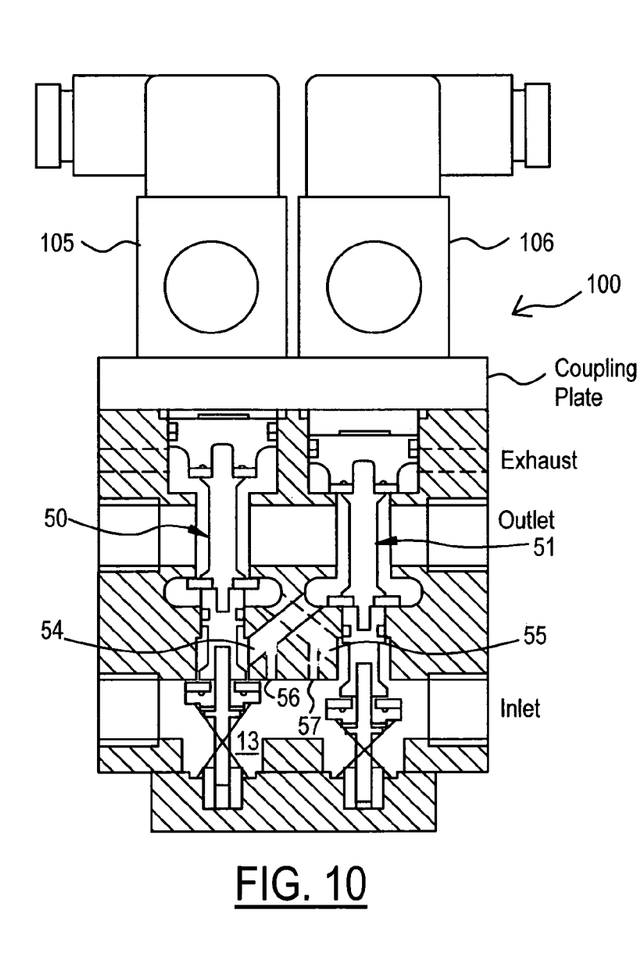
FIG. 10 is a cross-sectional view of the double valve of FIG. 9 in a faulted state.

FIG. 10 shows valve 100 of FIG. 9 wherein a malfunction occurs during valve actuation such that a faulted state results. Valve unit 51 is in an actuated position and valve unit 50 is in a deactuated position, so that the pressure in crossover 54 drops and the pressure in a corresponding timing chamber (not shown) continues to drop. When the timing chamber pressure drops to approximately 50% of the inlet pressure, valve unit 50 will remain in the deactuated position since the corresponding actuator 105 no longer has sufficient pressure to create an actuation. When both actuators 105 and 106 are deactuated, the pair of springs 60 and 61 move the internal valve units 50 and 51 to their deactuated positions and valve 100 can automatically begin another cycle since the crossover passages 54 and 55 become re-pressurized via bypass passages 56 and 57.

Figure 11:
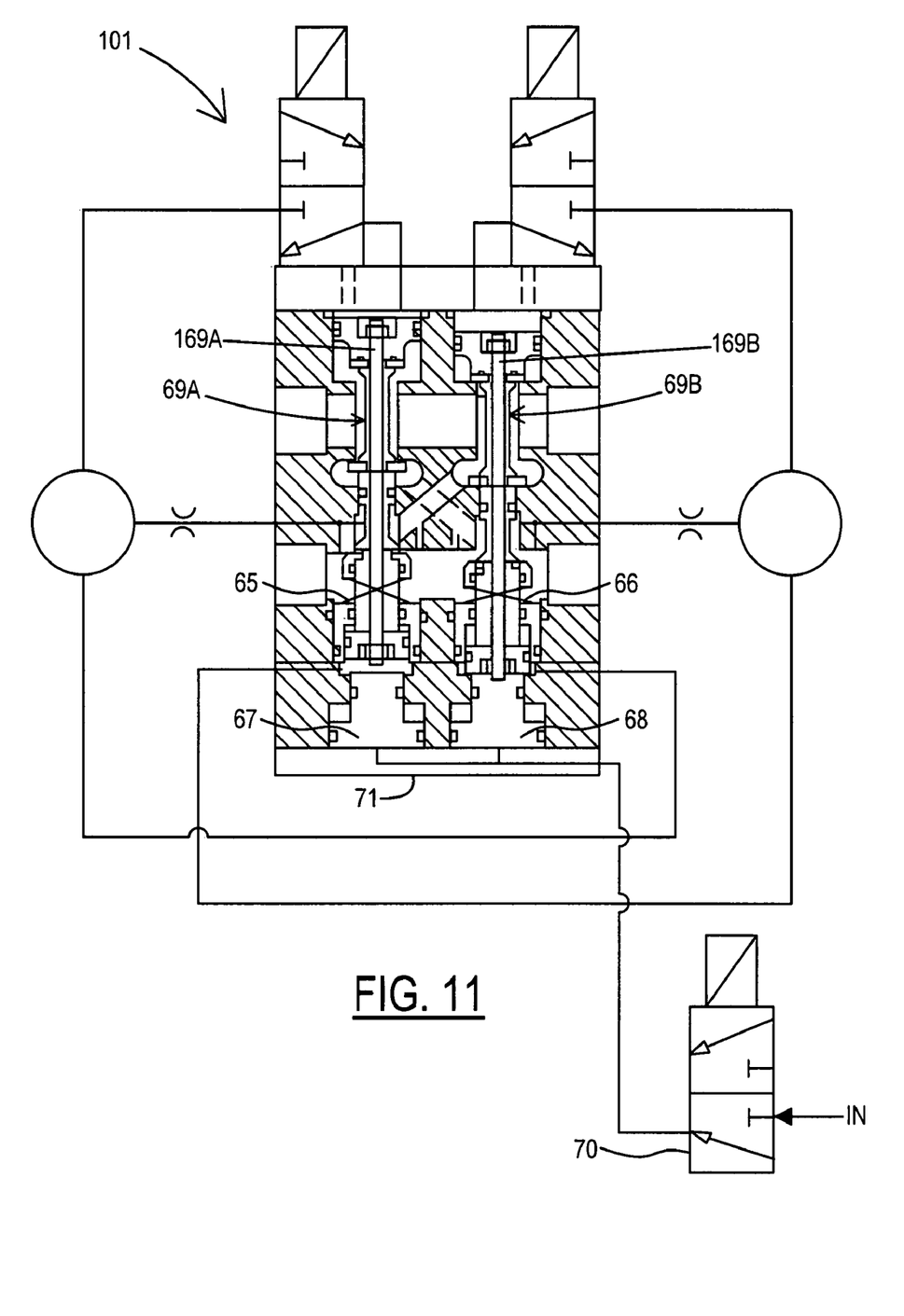
FIG. 11 is a cross-sectional view of a three-position double valve of the present invention in a faulted state.

FIG. 11 shows another embodiment employing a 3-position double valve 101 wherein return springs 65 and 66 are configured to only return the valve units 69A and 69B to an intermediate position between the actuated and deactuated positions. FIG. 11 shows a double valve 101 in a faulted state. When all pressure is removed from double valve 101 in the faulted state, it remains in the faulted state by virtue of a valve unit 69A or 69B which is already at the intermediate position or the actuated position becoming balanced at the intermediate position. In order to reset double valve 101, pistons 67 and 68 are provided in alignment with valve units 69A and 69B and are selectively controlled via pressure from a reset pilot 70, which is supplied through a coupling block 71 to pistons 67 and 68. More specifically, when double valve 101 has entered a faulted state and it is desired to reset it to a deactuated state, then reset pilot 70 is actuated so that pressurized fluid is supplied against pistons 67 and 68, forcing them upward against valve units 69A and 69B so that they are restored to their deactuated positions.

Figure 12:
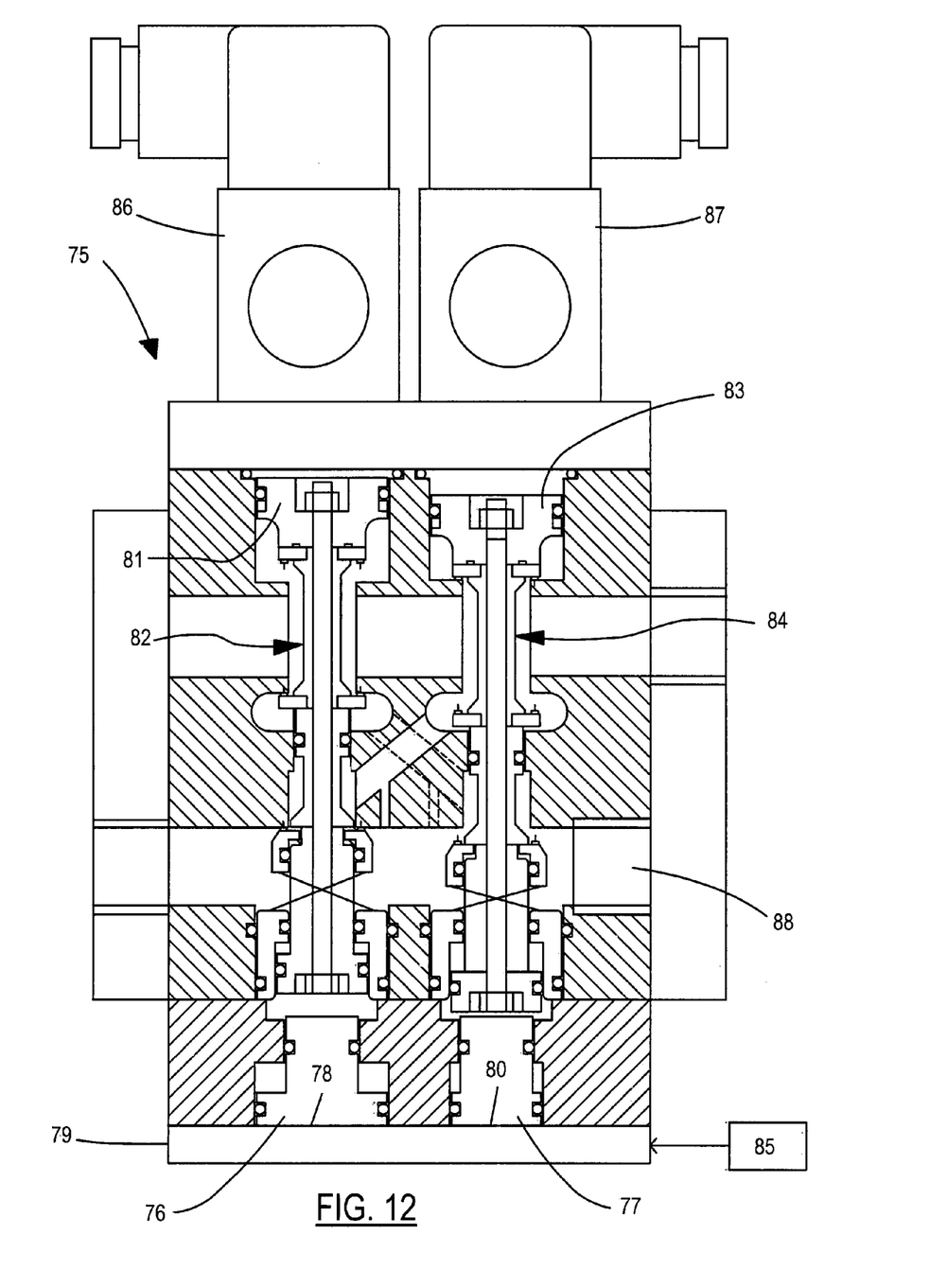
FIG. 12 is a cross-sectional view of a three-position double valve of the present invention with modified reset-pistons, wherein the valve is in a faulted state.

FIG. 12 shows a further embodiment incorporating an additional protection feature wherein a double valve 75 remains in a faulted state even after application of reset pressure unless the reset pressure is turned off prior to subsequent operation of the valve 75. Double valve 75 shown in a faulted state has a first reset piston 76 and a second reset piston 77. Reset piston 76 has a surface 78 for receiving reset pressure from a source, such as a reset pilot 85, through a coupling block 79. Piston 77 has a surface 80 likewise receiving reset pressure from source 85 through coupling block 79. Surface 78 has an area which is large compared to a surface of actuating piston 81 so that the first valve unit 82 moves into the deactuated position during a reset even if pressure is applied to actuating piston 81. Surface area 80 of second reset piston 77 is small compared to the area of an actuating piston 83 of second valve unit 84. Thus, during a reset operation, if actuators 86 and 87 are turned on and pressure is applied against actuating piston 83, then reset piston 80 generates insufficient force to move valve unit 84 into its deactuated position and it instead moves to the actuated position. Thus, valve 75 will not cycle with reset pressure from source 85 turned on. Any time that valve 75 is receiving reset pressure and actuators 86 and

87 are also energized, it enters the faulted state. Moreover, if valve 75 is in its deactuated position with a source of pressurized fluid being supplied to inlet 88, turning off the source and then turning it back on will result in valve 75 remaining in the deactuated position. If valve 75 is in the faulted state, then turning the source off and then back on will result in valve 75 remaining in the faulted state. Consequently, valve 75 cannot be reset by turning off and on the source of pressurized fluid to inlet 88. Since valve 75 likewise cannot cycle with pressure from source 85 turned on, the user will be required to correct any malfunctioning valve unit 75 before normal operation can continue.

What is claimed is:

1. A valve system comprising:
   a body defining an inlet, an outlet, and an exhaust, wherein the inlet is adapted to be coupled to a source of pressurized fluid;
   a first valve unit including a first exhaust poppet and a first inlet poppet, wherein the first exhaust poppet is movable between an open position for coupling the outlet to the exhaust and a closed position for isolating the outlet from the exhaust, wherein the first inlet poppet is movable between an open position for coupling the outlet to the inlet and a closed position for isolating the outlet from the inlet, wherein the first valve unit is movable to a deactuated position wherein the first inlet poppet is in its closed position and the first exhaust poppet is in its open position;
   a second valve unit including a second exhaust poppet and a second inlet poppet, wherein the second exhaust poppet is movable between an open position for coupling the outlet to the exhaust and a closed position for isolating the outlet from the exhaust, wherein the second inlet poppet is movable between an open position for coupling the outlet to the inlet and a closed position for isolating the outlet from the inlet, wherein the second valve unit is movable to a deactuated position wherein the second inlet poppet is in its closed position and the second exhaust poppet is in its open position, the valve system being in a faulted state when one of the first and second valve units is in a deactuated position when the other of the first and second valve units is not in a deactuated position;
   a first crossover passage providing a first flow path between the inlet and the second inlet poppet;
   a second crossover passage providing a second flow path between the inlet and the first inlet poppet;
   a first crossover poppet included in the first valve unit for coupling the first crossover passage to the inlet when the first valve unit is not in the deactuated position and decoupling the first crossover passage from the inlet when the first valve unit is in the deactuated position;
   a second crossover poppet included in the second valve unit for coupling the second crossover passage to the inlet when the second valve unit is not in the deactuated position and decoupling the second crossover passage from the inlet when the second valve unit is in the deactuated position;
   a first bypass passage coupling the inlet and the first crossover passage, wherein the first bypass passage has a predetermined cross-section to provide a predetermined flow such that when the valve system is in the faulted state and the second valve unit is not in the deactuated position then pressurized fluid passing through the first bypass passage pressurizes the outlet to no more than 1% of the pressure of the source of pressurized fluid; and
   a second bypass passage coupling the inlet and the second crossover passage, wherein the second bypass passage has a predetermined cross-section to provide a predetermined flow such that when the valve system is in the faulted state and the first valve unit is not in the deactuated position then pressurized fluid passing through the second bypass passage pressurizes the outlet to no more than 1% of the pressure of the source of pressurized fluid.

2. The valve system of claim 1 wherein the first and second bypass passages are formed in the body.

3. The valve system of claim 1 wherein the first and second bypass passages are formed in the first and second valve units, respectively.

4. The valve system of claim 1 further comprising:
   first and second return springs disposed in contact with the first and second valve units, respectively, for urging the first and second valve units toward their respective deactuated positions.

5. The valve system of claim 1 wherein a flow coefficient $C_{v1}$ is provided from the inlet to the outlet, wherein a flow coefficient $C_{v2}$ is provided from the outlet to the exhaust, and wherein the ratio of $C_{v2}$ to $C_{v1}$ is less than about 2.5.

6. A valve system comprising:
   a body defining an inlet, an outlet, and an exhaust, wherein the inlet is adapted to be coupled to a source of pressurized fluid;
   a first valve unit including a first exhaust poppet and a first inlet poppet, wherein the first exhaust poppet is movable between an open position for coupling the outlet to the exhaust and a closed position for isolating the outlet from the exhaust, wherein the first inlet poppet is movable between an open position for coupling the outlet to the inlet and a closed position for isolating the outlet from the inlet, wherein the first valve unit is movable to an actuated position a deactuated position, and an intermediate position, wherein the actuated position comprises the first inlet poppet being in its open position and the first exhaust poppet being in its closed position, wherein the deactuated position comprises the first inlet poppet being in its closed position and the first exhaust poppet being in its open position, and wherein the intermediate position comprises the first inlet poppet being in its open position and the first exhaust poppet being in its open position;
   a second valve unit including a second exhaust poppet and a second inlet poppet, wherein the second exhaust poppet is movable between an open position for coupling the outlet to the exhaust and a closed position for isolating the outlet from the exhaust, wherein the second inlet poppet is movable between an open position for coupling the outlet to the inlet and a closed position for isolating the outlet from the inlet, wherein the second valve unit is movable to an actuated position, a deactuated position, and an intermediate position, wherein the actuated position comprises the second inlet poppet being in its open position and the second exhaust poppet being in its closed position, wherein the deactuated position comprises the second inlet poppet being in its closed position and the second exhaust poppet being in its open position, and wherein the intermediate position comprises the second inlet poppet being in its open position and the second exhaust poppet being in its open position, the valve system being in a faulted state when one of the first and second valve units is in a deactuated position when the other of the first and second valve units is in any position other than a deactuated position;

a first crossover passage providing a first flow path between the inlet and the second inlet poppet;

a second crossover passage providing a second flow path between the inlet and the first inlet poppet;

a first crossover poppet included in the first valve unit and being movable between an open position for coupling the inlet to the first crossover passage and a closed position for decoupling the inlet from the first crossover passage;

a second crossover poppet included in the second valve unit and being movable between an open position for coupling the inlet to the second crossover passage and a closed position for decoupling the inlet from the second crossover passage;

a first bypass passage coupling the inlet and the first crossover passage, wherein the first bypass passage has a predetermined cross-section to provide a predetermined flow such that when the valve system is in the faulted state and the second valve unit is in any position other than a deactuated position then pressurized fluid passing through the first bypass passage pressurizes the outlet to no more than 1% of the pressure of the source of pressurized fluid; and a second bypass passage coupling the inlet and the second crossover passage, wherein the second bypass passage has a predetermined cross-section to provide a predetermined flow such that when the valve system is in the faulted state and the first valve unit is in any position other than a deactuated position then pressurized fluid passing through the second bypass passage pressurizes the outlet to no more than 1% of the pressure of the source of pressurized fluid.

7. The valve system of claim 6 wherein the first and second bypass passages are formed in the body.

8. The valve system of claim 6 wherein the first and second bypass passages are formed in the first and second valve units, respectively.

9. The valve system of claim 6 further comprising:
first and second return springs disposed in contact with the first and second valve units, respectively, for urging the first and second valve units toward their respective intermediate positions.

10. The valve system of claim 6 further comprising:
first and second reset pistons disposed in alignment with the first and second valve units, respectively, for urging the first and second valve units toward their respective deactuated positions in response to a source of reset pressure, wherein the first reset piston has a first surface area receiving the reset pressure so that a force is generated by the first reset piston that overcomes any force acting on the first valve unit from a pilot pressure, and wherein the second reset piston has a second surface area receiving the reset pressure so that a force is generated by the second reset piston that is less than any force acting on the second valve unit because of the pilot pressure, whereby the valve system enters a faulted state if the pilot pressure and the reset pressure are present simultaneously.

11. The valve system of claim 10 wherein the reset pressure is selectably supplied via a reset pilot.

12. The valve system of claim 6 wherein a flow coefficient $C_{v1}$ is provided from the inlet to the outlet, wherein a flow coefficient $C_{v2}$ is provided from the outlet to the exhaust, and wherein the ratio of $C_{v2}$ to $C_{v1}$ is less than about 2.5.

13. A valve system comprising:
a body defining an inlet, an outlet, an exhaust, a first pilot port, and a second pilot port, wherein the inlet is adapted to be coupled to a source of pressurized fluid, and wherein the first and second pilot ports are adapted to receive pilot pressure from respective pilots;

a first valve unit including a first exhaust poppet and a first inlet poppet, wherein the first exhaust poppet is movable between an open position for coupling the outlet to the exhaust and a closed position for isolating the outlet from the exhaust in response to pilot pressure from the first pilot port, wherein the first inlet poppet is movable between an open position for coupling the outlet to the inlet and a closed position for isolating the outlet from the inlet, wherein the first valve unit is movable to a deactuated position, wherein the deactuated position comprises the first inlet poppet being in its closed position and the first exhaust poppet being in its open position;

a second valve unit including a second exhaust poppet and a second inlet poppet, wherein the second exhaust poppet is movable between an open position for coupling the outlet to the exhaust and a closed position for isolating the outlet from the exhaust in response to pilot pressure from the second pilot port, wherein the second inlet poppet is movable between an open position for coupling the outlet to the inlet and a closed position for isolating the outlet from the inlet, wherein the second valve unit is movable to a deactuated position, wherein the deactuated position comprises the second inlet poppet being in its closed position and the second exhaust poppet being in its open position, the valve system being in a faulted state when one of the first and second valve units is in the deactuated position when the other of the first and second valve units is not in the deactuated position;

a first crossover passage providing a first flow path between the inlet and the second inlet poppet;

a second crossover passage providing a second flow path between the inlet and the first inlet poppet; and first and second reset pistons disposed in alignment with the first and second valve units, respectively, for urging the first and second valve units toward their respective deactuated positions in response to a source of reset pressure, wherein the first reset piston has a first surface area receiving the reset pressure so that a force is generated by the first reset piston that overcomes any force acting on the first valve unit from the pilot pressure, and wherein the second reset piston has a second surface area receiving the reset pressure so that a force is generated by the second reset piston that is less than any force acting on the second valve unit because of the pilot pressure, whereby the valve system enters a faulted state if the pilot pressure and the reset pressure are present simultaneously.

14. The valve system of claim 13 further comprising:
first and second return springs disposed in contact with the first and second valve units, respectively, for urging the first and second valve units toward but not fully into their respective deactuated positions in the absence of the pilot pressure at the respective pilot ports.

15. The valve system of claim 13 wherein the reset pressure is selectably supplied via a reset pilot.

* * * * *